United States Patent
Cai et al.

(10) Patent No.: US 10,275,515 B2
(45) Date of Patent: Apr. 30, 2019

(54) QUESTION-ANSWER PAIR GENERATION

(71) Applicant: International Business Machines Corporation, Armonk, NY (US)

(72) Inventors: Ke Ke Cai, Beijing (CN); Dong Xu Duan, Beijing (CN); Zhong Su, Beijing (CN); Xiao Lu Zhang, Beijing (CN); Li Zhang, Beijing (CN); Shi Wan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 15/438,139

(22) Filed: Feb. 21, 2017

(65) Prior Publication Data
US 2018/0239811 A1    Aug. 23, 2018

(51) Int. Cl.
*G06F 7/00*      (2006.01)
*G06F 17/30*     (2006.01)
*G06F 17/27*     (2006.01)

(52) U.S. Cl.
CPC ...... *G06F 17/30654* (2013.01); *G06F 17/279* (2013.01); *G06F 17/2785* (2013.01); *G06F 17/30684* (2013.01)

(58) Field of Classification Search
None
See application file for complete search history.

(56) References Cited

U.S. PATENT DOCUMENTS

| | | | |
|---|---|---|---|
| 9,401,881 B2 | 7/2016 | Isenee et al. | |
| 2011/0125734 A1* | 5/2011 | Duboue | G09B 7/00 707/723 |
| 2013/0304730 A1* | 11/2013 | Zhou | G06F 17/30864 707/723 |
| 2014/0222743 A1 | 8/2014 | Baughman et al. | |
| 2014/0259009 A1* | 9/2014 | Bhattiprolu | G06F 8/61 717/174 |
| 2014/0278378 A1 | 9/2014 | Mellett | |
| 2015/0088998 A1* | 3/2015 | Isensee | H04L 51/02 709/206 |
| 2016/0196497 A1 | 7/2016 | Allen et al. | |

FOREIGN PATENT DOCUMENTS

CN    103823794 A    5/2014

OTHER PUBLICATIONS

Michael Heilman, "Automatic Factual Question Generation from Text," Carnegie Mellon University, Doctoral Dissertation 2011, 203 pages.

Y. Xu et al., "Automatic Question Generation and Answer Judging: A Q&A Game for Language Learning," https://groups.csail.mit.edu/sls/publications/2009/SIGSLaTE09_Xu.pdf, 2009, 4 pages.

X. Yao et al., "Creating Conversational Characters Using Question Generation Tools," Dialogue and Discourse, Jan. 2012, pp. 125-146, vol. 3, No. 2.

* cited by examiner

Primary Examiner — Tuan A Pham
(74) Attorney, Agent, or Firm — Vazken Alexanian; Ryan, Mason & Lewis, LLP (57) ABSTRACT

In response to receiving a question, a corpus of textual data having content related to the question is obtained. At least one segment is extracted from the corpus of textual data. At least one question-answer pair is generated from at least one segment. Each question-answer pair comprises a candidate question and an answer corresponding to the candidate question.

13 Claims, 4 Drawing Sheets

QUESTION-ANSWER PAIR GENERATION

BACKGROUND

Question-answering services have become increasingly popular and widely-used in a large variety of fields to facilitate access to the information world. However, providing satisfactory question-answering services to users is becoming more challenging. Conventional approaches for handling a question-answering task may include, for example, collecting predefined question-answer pairs to provide question-answering services, and searching for an answer and ranking the answer to match the question.

However, in many cases, such conventional approaches cannot offer an answer to the question input by a user that meets user expectations. For example, there is a limit with respect to predefining a large quantity of question-answer pairs, and a limit with respect to preparing comprehensive question-answer pairs to meet the needs of users with different types of questions. Also, a conventional question-answering service may require a user to "effectively" ask a question, i.e., if the question more accurately expresses the user's intention, the more likely the user gets an appropriate answer to the question. However, in many cases, the user may not be familiar with the field and/or terms related to the question. In such cases, the user cannot may not be able to submit an "effective" question and, as such, the probability of obtaining an appropriate or satisfactory answer may decrease.

SUMMARY

Exemplary embodiments of the present disclosure provide a method, device, and computer program product for providing more extensive questions and answers for a user in an interactive way.

In one aspect, a computer-implemented method is provided. According to the method, in response to receiving a question, a corpus of textual data having content related to the question is obtained. At least one segment is extracted from the corpus of textual data. Based on the at least one segment, at least one question-answer pair is generated. Each question-answer pair comprises a candidate question and an answer corresponding to the candidate question.

In another aspect, a device is proposed. The device includes a processing unit and a memory operatively coupled to the processing unit. The processing unit is configure to: in response to receipt of a question, obtain a corpus of textual data having content related to the question; extract at least one segment from the corpus of textual data; and generate at least one question-answer pair based on the at least one segment, with each question-answer pair comprising a candidate question and an answer corresponding to the candidate question.

In yet another aspect, a computer program product is provided. The computer program product is tangibly stored on a non-transient machine-readable medium and comprises machine-executable instructions. When executed on a device, the instructions cause the device to: in response to receipt of a question, obtain a corpus of textual data having content related to the question; extract at least one segment from the corpus of textual data; and generate at least one question-answer pair based on the at least one segment, with each question-answer pair comprising a candidate question and an answer corresponding to the candidate question.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
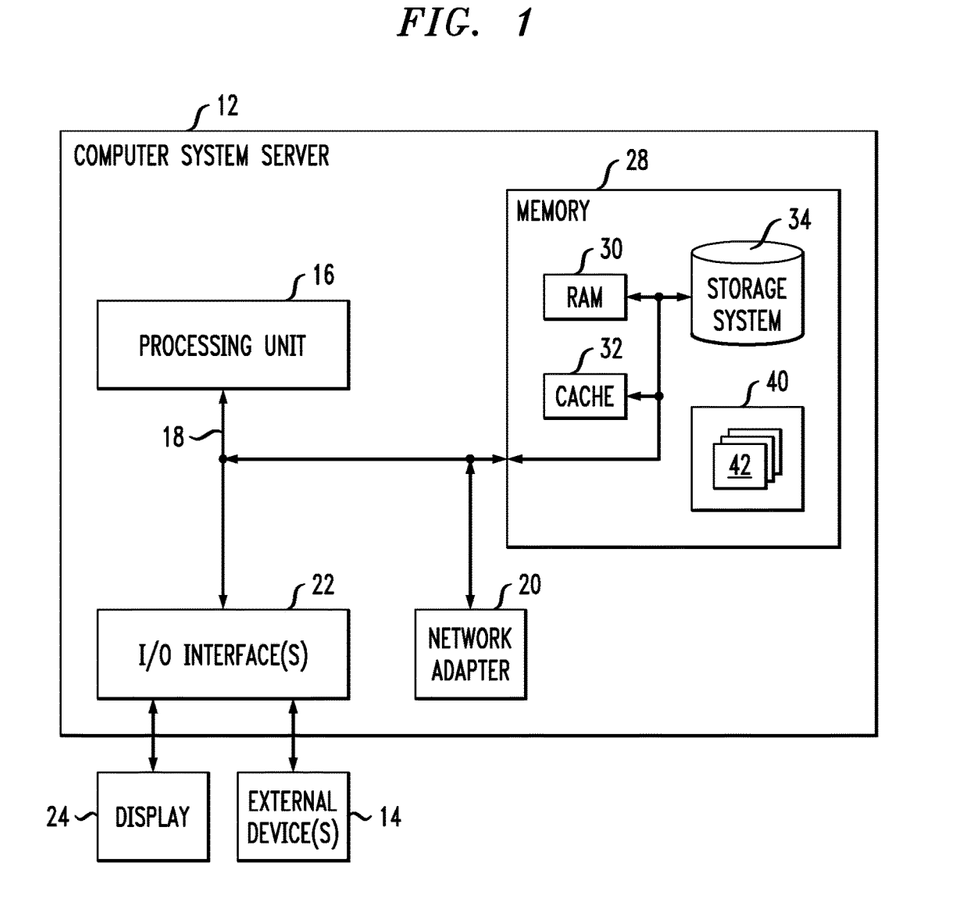
FIG. 1 is a block diagram of an electronic device suitable for implementing embodiments of the present disclosure.

Reference is first made to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As mentioned above, conventional question-answering systems may be limited with respect to preparing comprehensive question-answer pairs to meet the needs of users with different types of questions. Also, from the user side, in many cases it is difficult to contemplate a question that the user intends to express or ask. Therefore, there is a need for interactively providing extended questions based on the current questions being asked by users, to help the users receive more appropriate and satisfactory answers to their questions.

According to embodiments of the present disclosure, after a user inputs a question in form of, for example, a text input, voice input, or the like, a set of question-answer pairs are determined by analyzing the question, and providing a list of candidate questions to the user for selection. These question-answer pairs are generated from documents in a repository containing content related to the input question, thus they highly target the question input by the user. As such, the user can select a question that may lead to a more appropriate or satisfactory answer.

Figure 2:
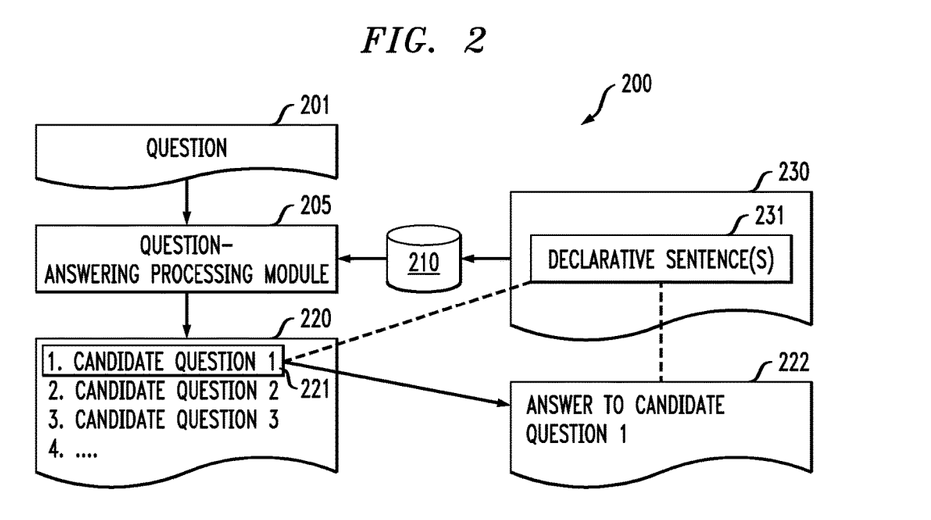
FIG. 2 depicts a diagram illustrating a process of providing question-answering services in accordance with embodiments of the present disclosure.

FIG. 2 illustrates a diagram of a simplified example question-answering processing procedure 200 according to an embodiment of the present disclosure. In an embodiment, the present disclosure may be used for a particular enterprise or an organization. The enterprise or organization may be for example, a museum or a healthcare service provider, etc., which has its local database for professional utilization. In this case, it is possible for a user who has a question related to, for example, some scientific issues, to get help with more comprehensive and professional questions and the corresponding answers in order to be provided with much better service and experience.

In this embodiment, a question-answering processing module 205 processes a question 201 input by a user. Here, the question-answering processing module 205 may be the computer system/server 12 or a part thereof as described in connection with FIG. 1. A repository 210, which contains all the documents or data used for providing the question-answering service, is accessible to the question-answering processing module 205. As an example, the repository 210 may include a portion 231 of a document 230, which may also be referred to as a segment or snippet, contains content related to the question 201. In one embodiment, and as shown, segment 231 may contain at least one declarative sentence related to the question 201, on the basis of which the documents are further processed.

The question-answering processing module 205 analyzes the question 201, and searches the repository 210 for a corpus of textual data having content related to the question 201. In an embodiment, the question-answering processing module 205 first analyzes the question 201 using one or more natural language processing technologies. For example, the question-answering processing module 205 may perform a morphological analysis and syntactic parse on the question 201, determine the type of the question 201 and obtain the syntactic dependency between the morphemes of the question.

Based on the analysis of the question 201, the question-answering processing module 205 further searches the repository 210 for a corpus of textual data considered to be related to the question 210, and obtains the corpus of textual data from the repository 210. For example, the question-answering processing module 205 may use some words extracted from the question 201 based on the analysis of the question 201 to search the repository 210 by matching these words with the documents or data in the repository 210. Other factors, such as the type of the question and inferences, may also be involved in searching for the corpus of textual data. Alternatively, any other suitable information retrieval techniques to collect documents considered to be related to question 201 may be used, in accordance with the embodiments described herein.

The question-answering processing module 205 then extracts at least one segment, such as segment 231, from the corpus of textual data. In an embodiment, the at least one segment can be extracted from the corpus of textual data by detecting sentence proximity of the sentences in the document 230 based on one or more of location and topic. For example, the question-answering processing module 205 may analyze the topics of the sentences in the document 230 and determine that one or more declarative sentences, which are relatively approximate to each other, may be formed into segment 231. Accordingly, at least one segment can be extracted from the corpus of textual data.

In one embodiment, the extracted segments may be further ranked by the question-answering processing module 205 based on some policies. These polices may be a relevance degree to the question 201 or some other appropriate approaches for increasing the accuracy or effective question-answer pairs. As an example, by counting the number of some key phrases in the segments, these segments may be ranked based on the counted number.

Once segment 231 is obtained, the question-answering processing module 205 may convert the statement of the segment 231 into a candidate question 221 that will be provided as a candidate to the user, and generate an answer 222 to the candidate question 221 from the segment 230. In one embodiment, in the case that the extracted segment 231 comprises only a single declarative sentence, the question-answering processing module 205 may convert this single declarative sentence to a factoid question, such as a who, where, when and how much type of question. For example, the segment 230 contains a sentence "Harvard University was established on Sep. 8, 1636." The question-answering processing module 205 may then convert this sentence into the question "when was Harvard University established?" To generate a factoid question from a single sentence, the following techniques may be used.

Sentence POS (Part of Speech) labeling and syntactic parse may be implemented on the single declarative sentence. Then, entities and key phrases may be identified in the sentence. For example, "Harvard University", "was established", "on" and "Sep. 8, 1636" may be POS labeled. "Harvard University" may be identified as an entity and "Sep. 8, 1636" may be identified as a key phrase. Generally, rules or templates built based on sentence keywords and syntactic structure are applied for generating the candidate question 221. In this simple example, the sentence may be determined to fit a when-type question rule or template, and therefore this sentence may be converted to a when-type question. From the analysis of the syntactic structure of the sentence, the sentence structure of the candidate question 221 may be determined. Accordingly, the answer to this question may be obtained from this sentence as well, i.e., "on Sep. 8, 1636" or "Harvard University was established on Sep. 8, 1636". Accordingly, a question-answer pair may be generated from a single declarative sentence.

It should be noted that the process described above can also be implemented with a learning model which labels the single sentence. With the learning model, the single sentence is converted to an appropriate type of question. In some cases, it is also possible to obtain more than one question from the single sentence, and thus more than one question-answer pair may be provided from one segment.

In another embodiment, in the case that the extracted segment 231 comprises a plurality of declarative sentences, the question-answering processing module 205 may convert the plurality of declarative sentences to a question, such as a why, how, what, etc. type of question. In this case, a sentence relationship of the plurality of declarative sentences may be determined. The sentence relationship may comprise an explicit relationship of the sentences in the segment 231. For example, the why-type of question may indicate that the segment 231 comprises a cause part and a consequence part. The sentence relationship may also comprise an internal relation of the sentences in the segment 231. For example, in some cases, it may be determined which sentence in the segment 231 will be generated to the candidate question 221 and which sentence or sentences in the segment will be generated to the answer 222. In addition, in some cases, the relative position of the sentences for generating the answer 222 may be determined.

In some embodiments, if the segment 231 contains some clue keywords, the question-answering processing module 205 may detect the explicit sentence relationship of the plurality of declarative sentences in the segment 231. The question-answering processing module 205 may then define different sets of clue keywords stored in the repository 210, or some other storage. For example, for a why-type question, the predefined clue keywords may be "because," "the reason," "that's why," etc. For a how-type question, the predefined clue words may be "in such manner," "by the means of," etc. The question-answering processing module 205 may compare the sentences in the segment 231 with the predefined sets of clue keywords to identify the sentence relationship of the sentences in the segment 231.

According to the explicit sentence relationship, the question-answering processing module 205 may generate the question 221 and the answer 222 from the sentences in the segment 231. For example, if the system detects the clue keyword "that's why" in segment 231, it determines that the sentences in segment 231 involve a cause part and a consequence part.

In some embodiments, the question-answering processing module 205 further performs, for example, semantic analysis on the plurality of sentences in the segment 231 to determine the internal relation of the plurality of sentences. For example, the analysis may determine which sentence belongs to the consequence part to be converted to the question 221, and which sentence or sentences belong to the cause part to be generated to the answer 222 to the question 221. In some cases the analysis may further determine whether the sentence is a beginning sentence for the answer, an intermediate sentence for the answer, or an end sentence for the answer.

For example, the segment 231 may contain the following sentences: "Japan has a long history of earthquakes and seismic activity. It is because Japan is located near three major tectonic plate boundaries, and is situated on the Pacific Ring of Fire." The question-answering processing module 205 may detect the clue keyword "because" in segment 231 by comparing the segment 231 with the predefined clue keywords. The semantic analysis may further identify that the statement "Japan has a long history of earthquakes and seismic activity." is the statement used to generate the question 221, and the statements "It is because that Japan is located near three major tectonic plate boundaries" and "and is situated on the Pacific Ring of Fire" are the statements used to generate the answer 222.

In this case, the question-answering processing module 205 generates the following candidate question 221: "Why does Japan have a long history of earthquakes and seismic activity?" and the corresponding answer 222: "It is because Japan is located near three major tectonic plate boundaries, and is situated on the Pacific Ring of Fire". In this way, a question-answer pair including the question 221 and the corresponding answer 222 is generated from the segment 230.

In some cases, it is possible for no clue keywords to be found in a segment. In such a situation, explicit sentence relationship detection may not be possible. According to some embodiments, the question-answering processing module 205 may determine the sentence relationship of the plurality of sentences in the segment 231 by means of a learning model for labeling multiple sequences. As an example, the learning model may be a CRF (Conditional Random Field)-based learning model. However, any other learning model that can be used for labeling multiple sequences may also be used, in accordance with the embodiments described herein.

According to some embodiments, features used for the CRF-based learning model may comprise word-level and sentence-level features. For example, word-level coherence, semantic relevance, co-reference, cue phrase, entities, n-gram phrase etc. may be used in feature definitions. There may be a large number of dimensions of features defined for the CRF-based learning model. The CRF-based learning model labels the sentences applied thereon as the following:

WH_S(k): representing the declarative sentence for generating a question;

B_A(k): representing the beginning declarative sentence for the answer to the generated question;

I_A(k): representing the intermediate declarative sentence for the answer to the generated question;

E_A(k): representing the end declarative sentence for the answer to the generated question, where k represents the type of the question, such as Why, How, What type etc.

The CRF-based learning model is trained in advance such that when the values of the features defined are given, each sentence is labeled as described above. Then the question 221 is converted from the sentence labeled with WH_S(k), and the corresponding answer 222 is constructed with the sentences labeled with B_A(k), I_A(k) and E_A(k). As such, a question-answer pair is generated.

It should be noted that in the case of the explicit sentence relationship being detected, instead of performing for example semantic analysis on the plurality of sentences in the segment 231, the CRF-based model may be also applied on these sentences to determine the internal relation of these sentences. It should be also noted that it is also possible to generate more than one question-answer pair from a segment having a plurality of declarative sentences. For example, different types of question-answer pairs may be generated from one segment.

Similarly, the question-answering processing module 205 may generate a list of candidate question-answer pairs from segments extracted from the corpus of textual data. Further, the candidate pairs may be ranked according to some criteria, such as the type of the questions, or the type of the questions combined with the same criteria as the segment ranking, etc. The question-answering processing module 205 may then provide at least a portion of the ranked list of candidate questions to the user by, for example, outputting the at least a portion of the ranked list on as an image on a display device or as audio output. The number of the question-answer pairs provided to the user may be set to a fixed number or may be vary according to the total number of the candidate question-answer pairs.

If the user selects a question, the question-answering processing module 205 provides a corresponding answer to the user. For example, if the user selects the question 221 from the list 220, then the question-answering processing module 205 may provide the answer 222 to the user. In this way, the user is offered more extended questions, thus obtaining more knowledge of his/her intentional question. If the user further selects other questions from the list 220, he/she will accordingly get corresponding answers. In one embodiment, the question-answering processing module 205 may further provide another list of candidate questions based on the selection from the user, in order to provide more extended questions and answers.

The question-answering processing module 205 may be implemented in the computer system/server 12 shown in FIG. 1 and may be configured to implement embodiments of the present disclosure.

Figure 3:
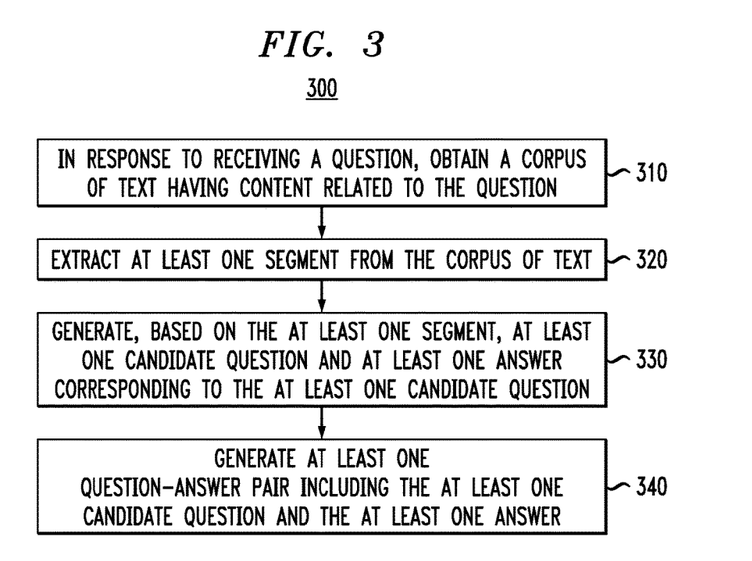
FIG. 3 depicts a flowchart illustrating a process for providing question-answering services in accordance with embodiments of the present disclosure.

FIG. 3 shows a flowchart of an exemplary method 300 for providing more extended questions and answers for a user in an interactive way in accordance with some embodiments of the present disclosure. At step 310, in response to receiving a question, a corpus of textual data having content related to the question is obtained. As described above, the corpus of textual data may be obtained by analyzing the question and searching from a repository which contains all the data for the question-answering services.

From the corpus of textual data, at least one segment is extracted at step 320. In one embodiment, the at least one segment comprises at least one declarative sentence. The extraction at step 320 may comprise determining sentence proximity of sentences within a document in the corpus of textual data based at least in part on a relative location of the sentences and a content relevance of the sentences. Based on the sentence proximity, the at least one segment is extracted from the corpus of textual data. In addition, the at least one extracted segment may be ranked according to some criteria such as a relevance degree to the question from the user.

At step 330, at least one candidate question and at least one answer corresponding to the at least one candidate question are generated based on the at least one segment. In the case of a segment including a single declarative sentence, a factoid question may be generated from the single declarative sentence. Accordingly, in the case of a single declarative sentence, the corresponding answer may be substantially similar to the single declarative sentence.

In the case of the at least one segment including a plurality of declarative sentences, the sentence relationship is determined, and the at least one candidate question is generated based on the determined sentence relationship. In some embodiments, one or more predefined words are extracted from the plurality of declarative sentences. From these extracted predefined words, the sentence relationship may be determined.

In some cases, the internal relation of the plurality of the declarative sentences is further determined using a trained learning model for labeling multiple sentences. The internal relation may indicate at least one of the following: a declarative sentence for generating a candidate question; a beginning declarative sentence for the corresponding answer to the candidate question; an intermediate declarative sentence for the corresponding answer to the candidate question; and an end declarative sentence for the corresponding answer to the candidate question.

Once the at least one candidate question and the at least one answer are generated, at step 340, at least one question-answer pair including the at least one candidate question and the at least one answer is generated accordingly.

According to the above steps, a number of question-answer pairs may be obtained from the corpus of textual data. These question-answer pairs may be ranked, and part of these ranked question-answer pairs may be provided to the user. In response to receiving a selection of the candidate question from the user, the answer to the candidate question is provided.

In one embodiment, the at least one segment may comprise a segment and a further segment extracted from the corpus of textual data at step 320. In this case, step 330 may comprise generating a further candidate question and an answer to the further candidate question from the further segment, and at step 340, a further question-answer pair including the further candidate question and an answer to the further candidate question is generated. In one embodiment, step 340 may further include ranking a candidate question and the further candidate question, and providing the ranking as feedback on the question. For example, the feedback may represent the popularity or frequency of the generated questions from the extracted segment set (i.e., the more frequent the question, the higher the ranking of the question).

The present disclosure may be a system, a method, and/or a computer program product. The computer program product may include a computer readable storage medium (or media) having computer readable program instructions thereon for causing a processor to carry out aspects of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
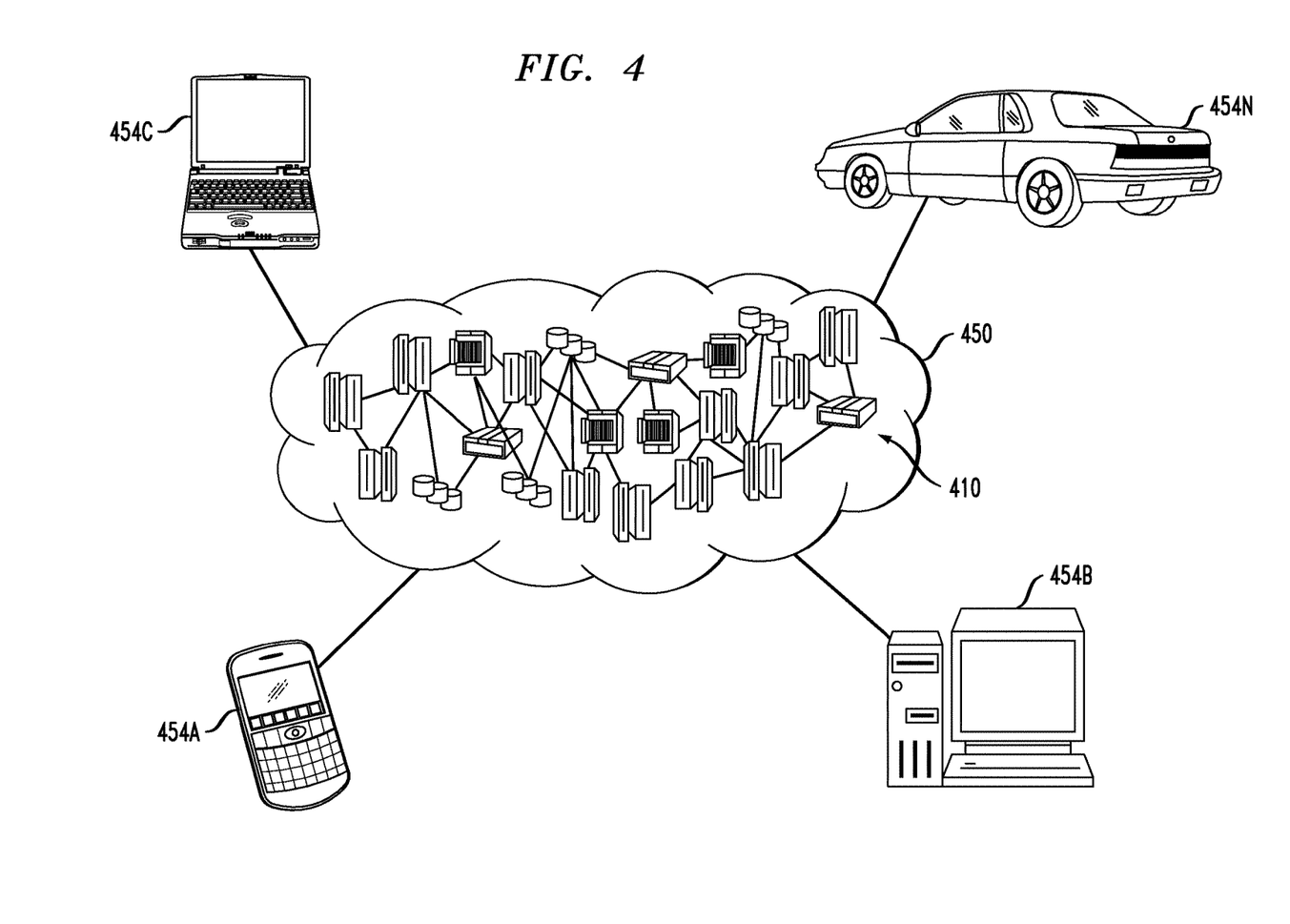
FIG. 4 depicts a cloud computing environment according to an embodiment.

Referring now to FIG. 4, illustrative cloud computing environment 450 is depicted. As shown, cloud computing environment 450 comprises one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
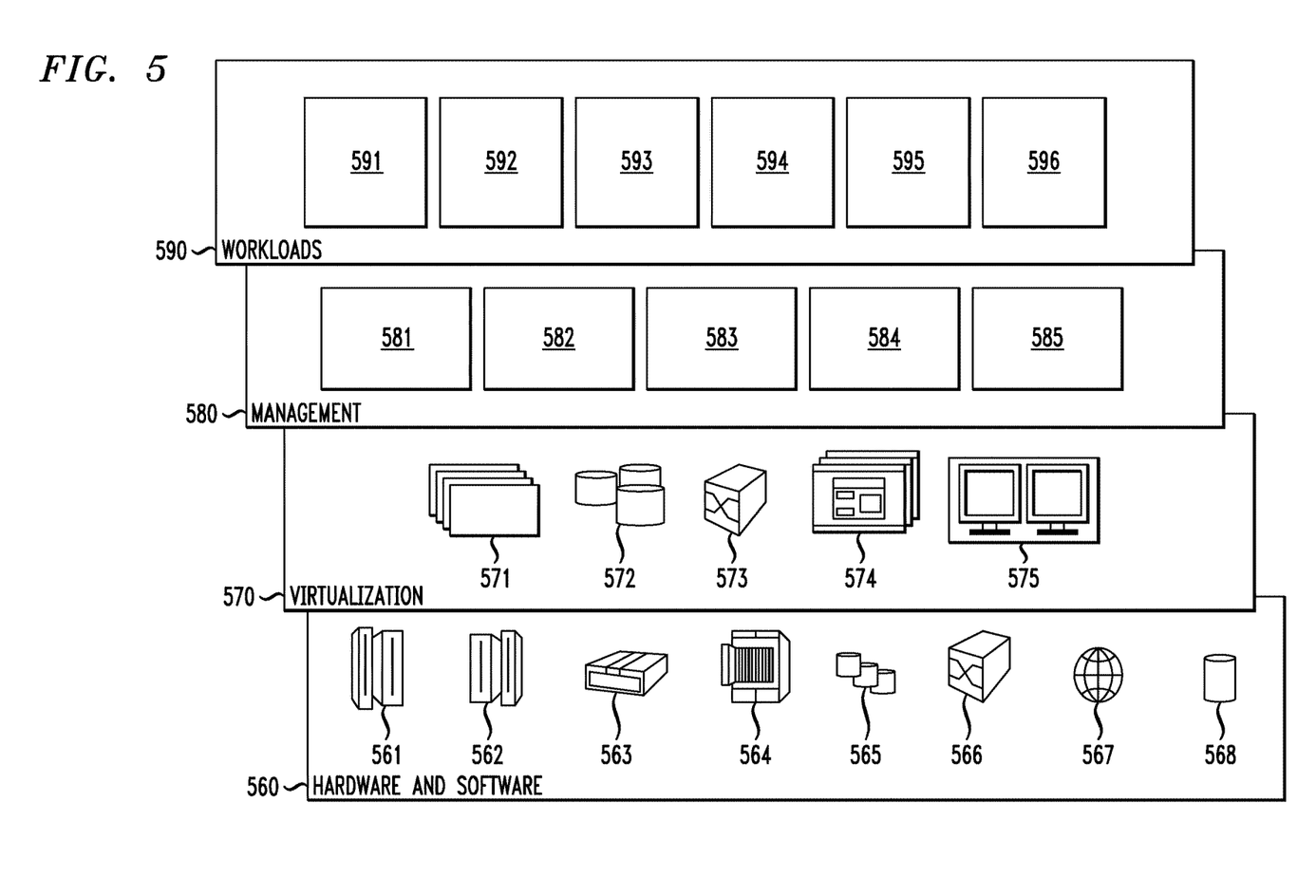
FIG. 5 depicts abstraction model layers according to an embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 868.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; data capturing 593; data analytics processing 594; transaction processing 595; and question-answer pair processing 596, which may perform one or more of the functions described above.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   in response to receiving a question, obtaining a corpus of textual data having content related to the question;
   extracting at least one segment having a plurality of declarative sentences from the corpus of textual data; and
   generating, based on the plurality of declarative statements, at least one question-answer pair, wherein each question-answer pair comprises a candidate question and an answer corresponding to the candidate question;
   wherein generating the at least one candidate question further includes:
   determining a sentence relationship of the plurality of declarative sentences, including:
   obtaining feature values of the plurality of declarative sentences, the feature values indicating word-level and sentence-level relevancy from a semantic analysis performed on the plurality of declarative sentences; and
   applying the feature values to a trained learning model used for labeling multiple sequences to identify the sentence relationship of the plurality of declarative sentences; and
   generating the at least one candidate question based on the determined sentence relationship;
   wherein the sentence relationship indicates a question category of the at least one candidate question and includes each of:
   a generating declarative sentence for generating the at least one candidate question;
   a beginning declarative sentence for the at least one answer corresponding to the at least one candidate question;
   an intermediate declarative sentence for the at least one answer corresponding to the at least one candidate question; and
   an end declarative sentence for the at least one answer corresponding to the at least one candidate question; and
   wherein the at least one segment comprises a further segment extracted from the corpus of textual data, and further comprising:
   generating a further question-answer pair including a further candidate question and an answer to the further candidate question from the further segment;
   ranking the candidate question and the further candidate question; and
   providing the ranking as a feedback on the question;
   wherein the steps of the method are performed by at least processing device comprising a processor operatively coupled to a memory.

2. The method of claim 1, wherein determining the sentence relationship of the plurality of declarative sentences further comprises:
   extracting one or more predefined words from the plurality of declarative sentences; and
   determining the sentence relationship based on the extracted one or more predefined words.

3. The method of claim 1, wherein extracting the at least one segment comprises:
   determining a sentence proximity of sentences within the corpus of textual data based at least in part on a relative location of the sentences and a content relevance of the sentences; and
   extracting the at least one segment having the plurality of declarative sentences based on the determined sentence proximity.

4. The method of claim 1, wherein the plurality of declarative sentences includes a selected single declarative sentence, and wherein generating the at least one candidate question comprises generating a factoid question based on the selected single declarative sentence.

5. The method of claim 1, wherein the at least one segment comprises a plurality of segments, and further comprising, prior to generating the at least one candidate question and the at least one answer, ranking the plurality of segments based on a relevance degree to the question.

6. The method of claim 1, further comprising, in response to receiving a selection of the at least one candidate question, providing the at least one answer corresponding to the at least one candidate question.

7. A computing system comprising:
a processing unit;
a memory operatively coupled to the processing unit
wherein the processing unit is configured to:
   in response to receipt of a question, obtain a corpus of textual data having content related to the question;
   extract at least one segment having a plurality of declarative sentences from the corpus of textual data;
   generate, based on the plurality of declarative statements, at least one question-answer pair, wherein each question-answer pair comprises a candidate question and an answer corresponding to the candidate question;
      wherein to generate the at least one candidate question further includes:
         determine a sentence relationship of the plurality of declarative sentences, including:
            obtain feature values of the plurality of declarative sentences, the feature values indicating word-level and sentence-level relevancy from a semantic analysis performed on the plurality of declarative sentences; and
            apply the feature values to a trained learning model used for labeling multiple sequences to identify the sentence relationship of the plurality of declarative sentences; and
         generate the at least one candidate question based on the determined sentence relationship;
         wherein the sentence relationship indicates a question category of the at least one candidate question and includes each of:
            a generating declarative sentence for generating the at least one candidate question;
            a beginning declarative sentence for the at least one answer corresponding to the at least one candidate question;
            an intermediate declarative sentence for the at least one answer corresponding to the at least one candidate question; and
            an end declarative sentence for the at least one answer corresponding to the at least one candidate question; and
   wherein the at least one segment comprises a further segment extracted from the corpus of textual data, and the processing unit is further configured to:
      generate a further question-answer pair including a further candidate question and an answer to the further candidate question from the further segment;
      rank the candidate question and the further candidate question; and
      provide the ranking as a feedback on the question.

8. The system of claim 7, wherein, in determining the sentence relationship of the plurality of declarative sentences, the processing unit is further configured to:
   extract one or more predefined words from the plurality of declarative sentences; and
   determine the sentence relationship based on the extracted one or more predefined words.

9. The system of claim 7, wherein, in extracting the at least one segment, the processing unit is further configured to:
   determine a sentence proximity of sentences within a document in the corpus of textual data based at least in part on a relative location of the sentences and a content relevance of the sentences; and
   extract the at least one segment having the plurality of declarative sentences based on the sentence proximity.

10. The system of claim 7, wherein the at least one segment comprises a selected single declarative sentence, and wherein, in the generation of the at least one candidate question, the processing unit is further configured to generate a factoid question based on the selected single declarative sentence.

11. The system of claim 7, wherein the at least one segment comprises a plurality of segments, and wherein the processing unit is further configured to, prior to the generation of the at least one candidate question and the at least one answer, rank the plurality of segments based on a relevance degree to the question.

12. A computer program product being tangibly stored on a non-transient machine-readable medium and comprising machine-executable instructions, the instructions, when executed on a device, causing the device to:
   in response to receipt of a question, obtain a corpus of textual data having content related to the question;
   extract at least one segment having a plurality of declarative sentences from the corpus of textual data; and
   generate, based on the plurality of declarative statements, at least one question-answer pair, wherein each question-answer pair comprises a candidate question and an answer corresponding to the candidate question;
      wherein to generate the at least one candidate question further includes:
         determine a sentence relationship of the plurality of declarative sentences, including:
            obtain feature values of the plurality of declarative sentences, the feature values indicating word-level and sentence-level relevancy from a semantic analysis performed on the plurality of declarative sentences; and
            apply the feature values to a trained learning model used for labeling multiple sequences to identify the sentence relationship of the plurality of declarative sentences; and
         generate the at least one candidate question based on the determined sentence relationship;
         wherein the sentence relationship indicates a question category of the at least one candidate question and includes each of:
            a generating declarative sentence for generating the at least one candidate question;
            a beginning declarative sentence for the at least one answer corresponding to the at least one candidate question;
            an intermediate declarative sentence for the at least one answer corresponding to the at least one candidate question; and
            an end declarative sentence for the at least one answer corresponding to the at least one candidate question; and
   wherein the at least one segment comprises a further segment extracted from the corpus of textual data, and wherein the device is configured to:
      generate a further question-answer pair including a further candidate question and an answer to the further candidate question from the further segment;
      rank the candidate question and the further candidate question; and
      provide the ranking as a feedback on the question;
   wherein the steps of the method are performed by at least processing device comprising a processor operatively coupled to a memory.

13. The computer program product of claim 12, wherein, in determining the sentence relationship of the plurality of declarative sentences, the device is further configured to:
- extract one or more predefined words from the plurality of declarative sentences; and
- determine the sentence relationship based on the extracted one or more predefined words.

\* \* \* \* \*